Feb. 1, 1938.  J. HAMMERL  2,107,115
MOTOR VEHICLE
Filed Oct. 23, 1933  2 Sheets-Sheet 1
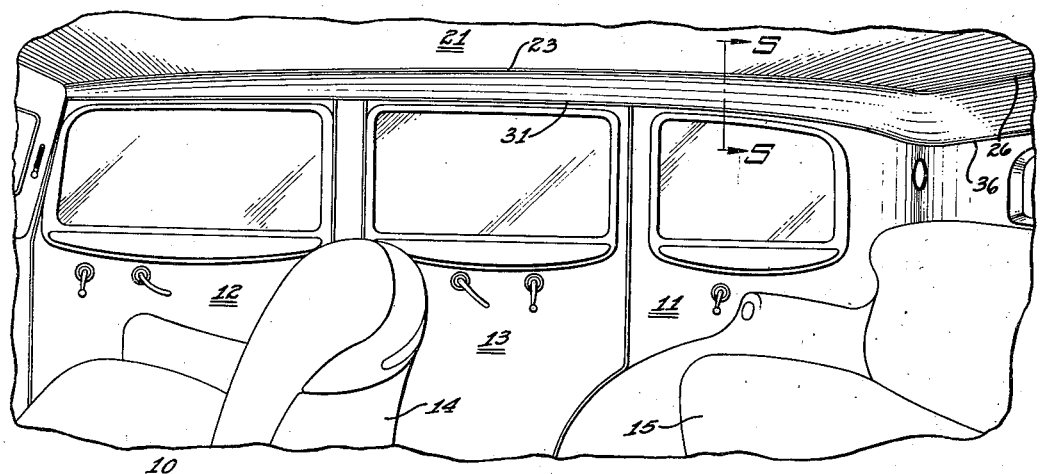
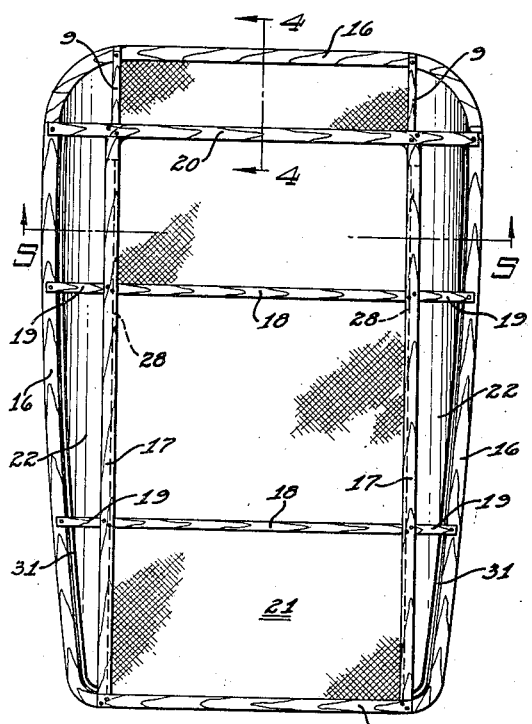
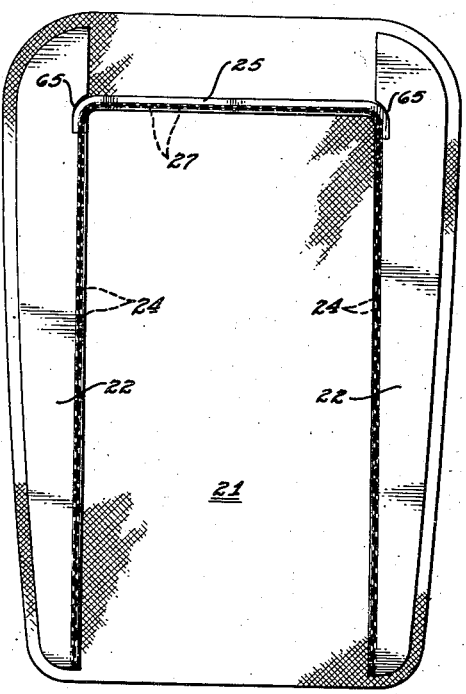
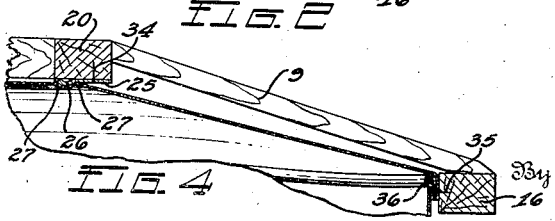
Inventor
JACOB HAMMERL.

Feb. 1, 1938.  J. HAMMERL  2,107,115
MOTOR VEHICLE
Filed Oct. 23, 1933  2 Sheets-Sheet 2
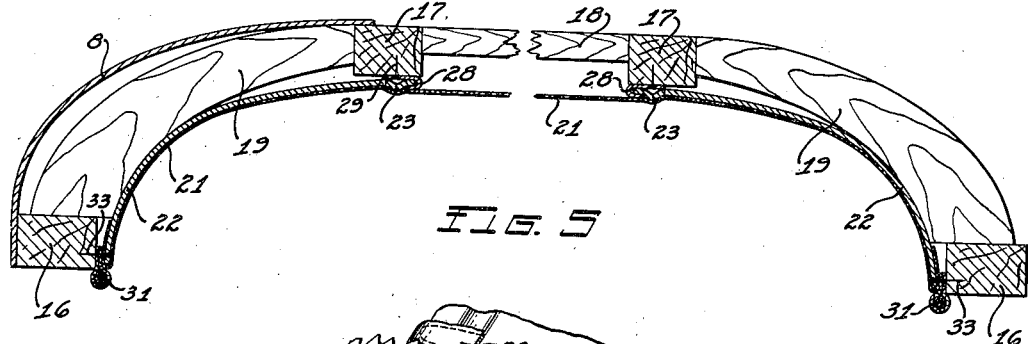
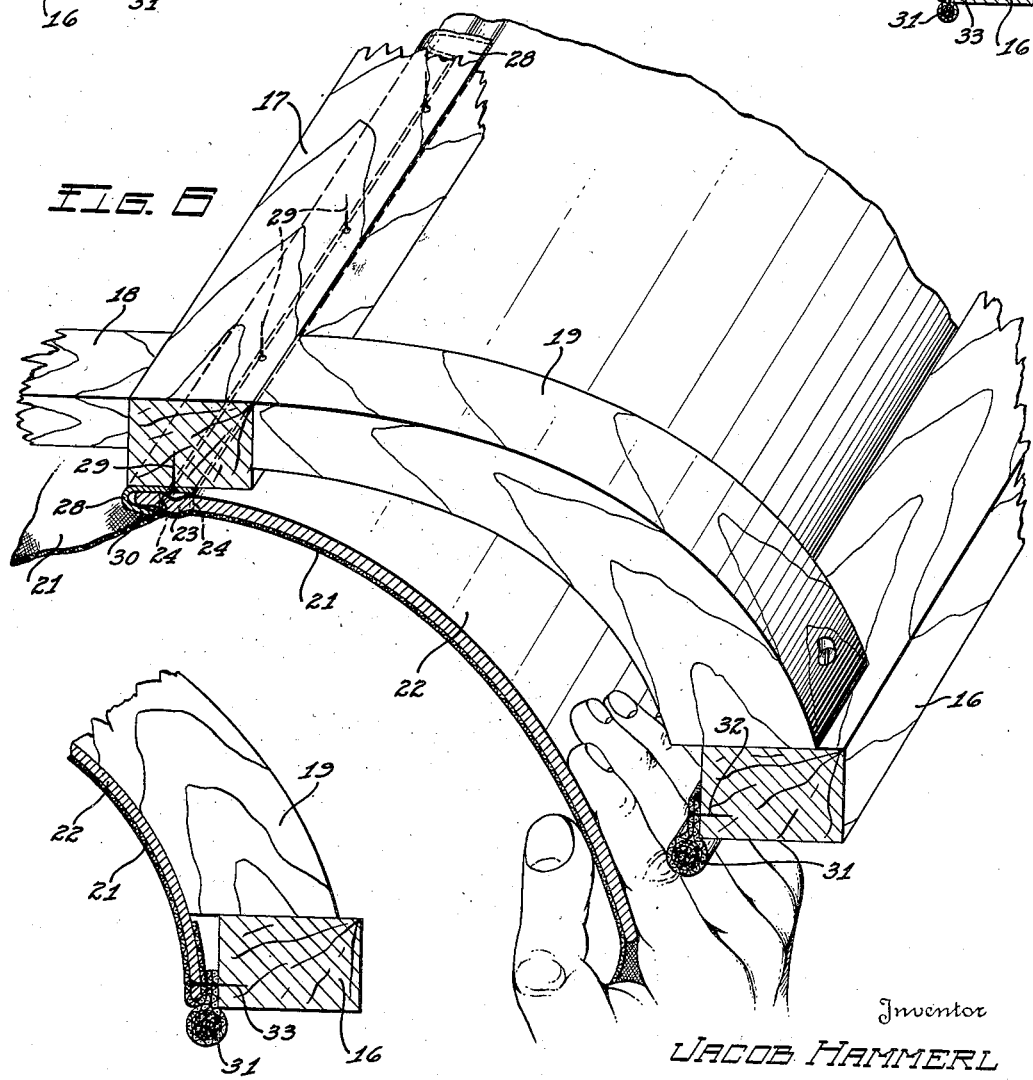
Inventor
JACOB HAMMERL Patented Feb. 1, 1938

2,107,115

UNITED STATES PATENT OFFICE 2,107,115

MOTOR VEHICLE

Jacob Hammerl, Detroit, Mich., assignor to Packard Motor Car Company, Detroit, Mich., a corporation of Michigan Application October 23, 1933, Serial No. 694,717

12 Claims. (Cl. 296—137)

This invention relates to vehicles and more particularly to vehicle body head lining.

An object of the invention is to improve the appearance of the interior of a vehicle body by the provision of a head lining which presents an unbroken surface having cove quarter sections.

Another object of the invention is to provide a head lining for vehicle bodies which can be quickly applied to the roof frame structure.

A further object of the invention is to provide a new and novel method of assembling a head lining within a vehicle body.

Still another object of the invention is to provide a unitary head lining structure for motor vehicle bodies which can be readily installed with the roof frame structure.

Other objects of the invention will appear from the following description taken in connection with the drawings, which form a part of this specification, and in which:

Fig. 1 is a perspective view of the interior of a motor vehicle body having my invention incorporated therein;

Fig. 2 is a top plan view of the vehicle body roof structure with the outer cover removed;

Fig. 3 is a plan view of the head lining for the body previous to its assembly with the roof structure;

Fig. 4 is a sectional view of the roof structure taken on line 4—4 of Fig. 2;

Fig. 5 is another sectional view with one side taken on line 5—5 of Fig. 2 and the other side taken on line 5—5 of Fig. 1;

Fig. 6 is a perspective view of a fragmentary portion of the roof structure showing the head lining in the course of being assembled;

Fig. 7 is a fragmentary sectional view showing a portion of the structure in Fig. 5 in enlarged form.

Referring now to the drawings by characters of reference, 10 indicates generally the body of a motor vehicle having side walls as indicated at 11, doors as indicated at 12 and 13 and front and rear seats 14 and 15.

The roof frame structure is of conventional form having a substantially rectangular roof rail 16 and longitudinally extending panel rails 17. Extending transversely of the roof frame between the panel rails are bow members 18 and in alignment with the bow members and extending between the panel rails and the sides of the roof rail are side strainer members 19. The panel rails are above the roof rail and the side strainer members are curved so that their ends will abut the roof rail and the panel rails. The panel rails terminate short of the end of the roof structure and are secured to the rear roof bow 20 which extends entirely across the structure and is secured at its ends to the sides of the roof rail. The rear ends of the panel rails are also secured to the roof bow 20 and extending rearwardly from the roof bow 20 in alignment with the panel rails are rear roof strainer members 9. These strainer members extend at an angle between the rear portion of the roof rail and the roof bow 20 and are secured thereto. A roof panel, as indicated at 8, is secured to cover the roof frame structure.

With a roof frame structure of the type described, I propose to associate a head lining structure which is preferably formed and assembled prior to its association with the roof frame structure and constructed to facilitate installation.

A length of fabric 21 is cut so that it conforms in shape to the outline of the roof rail, being however somewhat larger than the interior face of the rail, and backing or foundation members 22 are suitably associated therewith. These members are formed of stiff flexible sheet material, such as cardboard, and are arranged in desired relation with the fabric. In the present invention, I have shown the backing members associated with the fabric to form cove quarter sections. The inner edges of these backing members are cut out near their rear end, as indicated at 65, to receive the ends of a transversely extending backing or anchor strip 25 which is also preferably formed of cardboard. Each backing member 22 has a bead 23 pressed therefrom which extends longitudinally adjacent the inner side edge from the front to the cut out 65. The strip 25 also has a bead 26 pressed therein throughout its length and the relation of the ends of the strip with the backing members is such that the bead aligns in abutting relation with the rear ends of the beads 23. The cloth is sewed, as indicated at 24, to the backing members along each side of the beads and to the strip, as indicated at 27, along each side of the bead 26. The entire surfaces of the backing members, except between the outside edge of the beads and the inner side edges, are bound to the adjacent surface of the fabric by suitable adhesive material, such as cement, so that the areas of fabric so adhered will not wrinkle.

The fabric 21, the backing members 22 and the anchor strip 25 form a unitary head lining structure which can be readily assembled and quickly installed with the roof frame structure. The backing members and the strip are cut so that they can be associated with the roof frame elements in a relation to be hereafter described.

Provision is made for readily installing this unitary head lining in position with the roof frame structure. To this end, I provide a pair of clinch strips 28 which extend along the under side of the panel rails and cord welts 31 which extend along the inner walls of the sides of the roof rails and are secured thereto by nails 32. The clinch strips are secured along one edge to the panel rails by nails 29 and the loop ends 30 are normally bent downwardly so that sufficient space is provided into which an operator can push the inner side edge of a foundation member, as shown in Fig. 6. The fabric along the outer side edge of the backing member is next folded back into the relation shown in Fig. 7, and the backing member is flexed toward the roof structure until the free outer side edge passes over the adjacent welt. This welt serves to retain the edge of the roof lining in position when it is released by the workman, however, in order to prevent any possible displacement, brads 33 or other suitable fastening means are used to secure the lining structure to the roof rail. This flexed backing member forms a stiff cove shaped quarter section to which the cloth tightly adheres so that an unwrinkled curved fabric surface will be present within the body after the foundation is in assembled position.

The cloth material between the adjacent edges of the foundation members forwardly of the strip 25 is of less width than the space between the panel rails when applied so that, when the second foundation member is pushed in its clinch strip, this intermediate width of cloth will be stretched and thus provide a smooth interior surface which does not wrinkle or sag. After the second foundation member is properly positioned in the clinch strip, the same method of completing the installation of this foundation member is then followed as that employed with the other member.

It will thus be seen that the cove portions of the head lining structure can be readily installed with the roof structure.

The head lining structure extending at the rear of the roof bow 20 angles downwardly and the rear edge of the fabric is secured to the rear section of the roof rail. The strip 25, as previously described, is sewed to the cloth head lining and such strip is secured to the under face of the bow 20 and the rear end portion of the panel rails by nails, as indicated at 34. This strip provides an anchor for the fabric extending rearwardly therefrom so that the rear end of the fabric can be drawn to provide a smooth interior surface. The rear edge of the fabric is secured to the rear portion of the roof rail by means of nails as indicated at 35, such nails extending through a suitable welt 36 which provides a finishing strip along the rear edge of the head lining which joins with the side welts 31. The front end of the fabric is secured to the front roof pillar in a manner similar to that in which the rear end of the fabric is secured. However, this is conventional practice and further showing and description is not deemed necessary. To complete the installation of the head lining, the free ends 30 of the clinch strips are pressed upwardly tightly against the backing members.

It will be seen that I have provided a head lining having backing means associated therewith so that quick installation and a smooth interior surface will be formed. It will be further seen that cove quarter sections can be readily provided with such head lining.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a roof structure for vehicle bodies, the combination with a roof frame structure having roof side rails and a pair of panel rails intermediate and above the side rails, of a head lining fabric having a pair of flexible backing members affixed thereto in spaced relation along the side portions thereof, the distance between the backing members being less than the distance between the panel rails, clinch strips above the fabric head lining and secured to the panel rails for receiving the adjacent side edges of the backing members, the anchoring of said backing members stretching the fabric therebetween and welts fixed to the side roof rails for bearing against the outer side edges of the backing members.

2. A head lining structure for vehicle bodies comprising a piece of fabric, a pair of spaced flexible cardboard backing members along the quarter sections of the fabric, said members having a beading formed therein extending longitudinally thereof, the fabric being sewed to the backing members along each side of the beadings, and a cardboard backing strip extending transversely of the fabric adjacent the rear end thereof, said strip having a beading formed therein along its length and ends curved so that the beading joins the rear end of the beading in the side backing members, said fabric being sewed to the strip along each side of the beading.

3. A method of applying a head lining fabric with a pair of spaced longitudinally extending flexible resilient members fixed thereto to a roof structure having roof rails and panel rails carrying anchor means comprising affixing the adjacent edges of the backing members above the fabric to the anchor means on the panel rails, flexing the free portion of the backing members upwardly into cove form, and fixing the edges of the backing members opposite the anchored edges with the roof rails.

4. In a roof structure for vehicle bodies, the combination with panel rails having clinch strips fixed thereto and roof rails having cord welts fixed thereto, of a head lining structure comprising a piece of fabric and a pair of spaced longitudinally extending backing members fixed to one face of the fabric, the adjacent edge portions of the backing members being unsecured to the fabric and normally spaced a shorter distance apart than the clinch strips, said adjacent edge portions of the backing members above the fabric being engageable with the clinch strips for the purpose of anchoring the same and stretching the fabric therebetween, the backing members being flexible and secured to the roof rails in engaging relation with the cord welts.

5. In a roof structure for vehicle bodies, the combination with a roof frame, of a head lining structure comprising a piece of fabric having quarter section portions and resilient backing means extending along and attached to the quarter section portions of said fabric, the top edge portions of the backing means being free from the fabric, clinch means on said frame above said fabric for clamping the free edges of the backings and holding them in place, and means securing the edge portions of the backings opposite the clamped edges to the roof frame.

6. In a roof for vehicle bodies, the combination with a roof frame structure, of a head lining comprising a fabric with flexible spaced backing members cemented thereto except along their top adjacent edges, a pair of means less distance apart than and in which the adjacent edges of the backing members are anchored to the roof frame above the fabric, said backing members being flexed outwardly against the pair of anchor means to form cove quarter sections, and means securing the lower edges of the flexed backing members to the roof frame, the anchoring of said backing members stretching the fabric therebetween.

7. A method of applying a head lining fabric with a pair of stiff flexible backing members fixed thereto to a roof structure having roof rails with clinch strips and panel rails carrying cord welts comprising fixing the adjacent edges of the backing members above the lining fabric to the clinch strips on the roof rails to anchor the backing members and to stretch the fabric between the backing members, flexing the free portion of the backing members upwardly into cove form, and springing the flexed free edges opposite the anchored edges of the backing members of the cord welts to secure the same in flexed relation.

8. A method of applying a head lining fabric with a pair of spaced longitudinally extending stiff flexible backing members fixed thereto to a roof frame structure having roof rails and panel rails carrying anchor means, the fabric between the adjacent edges of the backing members being normally shorter than the distance between the anchor means on the panel rails, comprising engaging one of the adjacent edges of the backing members above the fabric in anchored relation with the anchor means on one of the panel rails, then engaging the adjacent edge of the other backing member in anchored relation with the anchor means on another panel rail and thereby stretching the fabric between such adjacent edges of the backing members to provide an unwrinkled under surface, and fixing the edges of the backing members opposite the adjacent edges to the roof rails.

9. In a roof structure for vehicle bodies, the combination with a roof frame structure having a roof rail and a panel rail above the roof rail and spaced laterally therefrom, of a fabric headlining having a stiff flexible backing means of greater width than the distance between the rails, retainer means on the panel rail in which one side edge of the backing means above the fabric headlining is inserted and anchored, a wind cord secured on the roof rail over which the other side edge of the backing means is sprung while flexed, said wind cord positioning said last mentioned edge, and means for securing said backing means relative to said roof rail in said position.

10. A head lining for motor vehicles comprising a fabric member, backing members of substantial width disposed on said fabric member in spaced relation, and means including stitching securing said backing members to said fabric member along lines spaced outwardly from the adjacent edges of said backing members.

11. A head lining for motor vehicles comprising a fabric member, an embossed backing member of substantial width disposed on said member, and means including stitching for securing said backing member to said fabric, said fabric member adhering to said embossed member in a manner following the surface contour of said embossed member.

12. A head lining for motor vehicles comprising a fabric member, a backing member having embossed portions disposed on said fabric member, and means including stitching for securing said fabric member against the surface contour of said backing member, said stitching following the surface contour pattern of said embossed portions.

JACOB HAMMERL.

CERTIFICATE OF CORRECTION.

Patent No. 2,107,115.   February 1, 1938.

JACOB HAMMERL.

It is hereby certified that error appears in the printed specification of the above numbered patent requiring correction as follows: Page 2, second column, line 42, claim 3, after the word "resilient" insert backing; and that the said Letters Patent should be read with this correction therein that the same may conform to the record of the case in the Patent Office.

Signed and sealed this 8th day of March, A. D. 1938.

(Seal)

Henry Van Arsdale,
Acting Commissioner of Patents.